US011932826B2

(12) United States Patent
Petkov et al.

(10) Patent No.: US 11,932,826 B2
(45) Date of Patent: Mar. 19, 2024

(54) SYNDET BAR COMPOSITION

(71) Applicant: KL-KEPONG OLEOMAS SDN BHD, Selangor (MY)

(72) Inventors: Jordan Todorov Petkov, Stockport (GB); Hui Xu, Selangor (MY); Kannan Karupaya, Selangor (MY); Yee Wei Ung, Selangor (MY)

(73) Assignee: KL-KEPONG OLEOMAS SDN BHD, Selangor Darul Ehsan (MY)

( * ) Notice: Subject to any disclaimer, the term of this patent is extended or adjusted under 35 U.S.C. 154(b) by 652 days.

(21) Appl. No.: 15/734,802

(22) PCT Filed: Apr. 24, 2019

(86) PCT No.: PCT/MY2019/050029

§ 371 (c)(1),
(2) Date: Dec. 3, 2020

(87) PCT Pub. No.: WO2019/235911

PCT Pub. Date: Dec. 12, 2019

(65) Prior Publication Data

US 2021/0230507 A1 Jul. 29, 2021

(30) Foreign Application Priority Data

Jun. 7, 2018 (MY) ............................ PI2018702242

(51) Int. Cl.

| | |
|---|---|
| ***C11D 1/04*** | (2006.01) |
| ***C11D 1/00*** | (2006.01) |
| ***C11D 1/14*** | (2006.01) |
| ***C11D 1/28*** | (2006.01) |
| ***C11D 1/37*** | (2006.01) |
| ***C11D 1/83*** | (2006.01) |
| ***C11D 1/831*** | (2006.01) |
| ***C11D 3/00*** | (2006.01) |
| ***C11D 3/14*** | (2006.01) |
| ***C11D 3/20*** | (2006.01) |
| ***C11D 3/22*** | (2006.01) |
| ***C11D 3/38*** | (2006.01) |
| ***C11D 3/382*** | (2006.01) |
| ***C11D 11/00*** | (2006.01) |
| ***C11D 17/00*** | (2006.01) |
| *C11D 1/12* | (2006.01) |
| *C11D 1/66* | (2006.01) |

(52) U.S. Cl.
CPC .............. *C11D 1/002* (2013.01); *C11D 1/831* (2013.01); *C11D 3/0005* (2013.01); *C11D 3/14* (2013.01); *C11D 3/2013* (2013.01); *C11D 3/2065* (2013.01); *C11D 3/2079* (2013.01); *C11D 3/222* (2013.01); *C11D 3/382* (2013.01); *C11D 11/0017* (2013.01); *C11D 17/006* (2013.01); *C11D 1/123* (2013.01); *C11D 1/143* (2013.01); *C11D 1/28* (2013.01); *C11D 1/37* (2013.01); *C11D 1/662* (2013.01)

(58) Field of Classification Search
None
See application file for complete search history.

(56) References Cited

U.S. PATENT DOCUMENTS

| | | | | |
|---|---|---|---|---|
| 4,565,647 | A | 1/1986 | Llenado | |
| 5,017,302 | A | 5/1991 | Colwell et al. | |
| 5,691,287 | A | 11/1997 | Villers et al. | |
| 6,458,751 | B1 | 10/2002 | Abbas et al. | |
| 2007/0004611 | A1 | 1/2007 | Ospinal et al. | |
| 2009/0048139 | A1 | 2/2009 | Chen et al. | |
| 2020/0165543 | A1 * | 5/2020 | Petkov ................ | C11D 3/2006 |

FOREIGN PATENT DOCUMENTS

| | | |
|---|---|---|
| EP | 1 032 640 | 12/2001 |
| WO | 99/20729 | 4/1999 |
| WO | WO 03/063819 A1 * | 8/2003 |
| WO | WO 2016/083043 A1 * | 6/2016 |

OTHER PUBLICATIONS

International Search Report for PCT/MY2019/050029, dated Jul. 24, 2019, 6 pages.
Written Opinion of the ISA for PCT/MY2019/050029, dated Jul. 24, 2019, 4 pages.
International Preliminary Report on Patentability for PCT/MY2019/050029, dated Sep. 30, 2020, 14 pages.

* cited by examiner

*Primary Examiner* — Lorna M Douyon
(74) *Attorney, Agent, or Firm* — NIXON & VANDERHYE, P.C.

(57) ABSTRACT

The invention relates to a syndet bar composition comprising sulfonated methyl ester of a fatty acid having a chain length of 16 to 18 carbon atoms (C16-C18), wherein the sulfonated methyl ester is present in an amount of 5% to 30% by weight of the composition; a co-surfactant selected from the group consisting of alkyl sulfosuccinate, alkyl sulfate, alkyl ether sulfate, alkyl polyglu-coside, or the combination thereof; a fatty alcohol selected from the group consisting of cetyl alcohol, stearyl alcohol or cetostearyl alcohol; a saturated fatty acid; a filler; and a humectant/moisturiser. The syndet bar composition is useful as a personal cleaning, laundry or dishwashing bar.

20 Claims, No Drawings

SYNDET BAR COMPOSITION

This application is the U.S. national phase of International Application No. PCT/MY2019/050029 filed 24 Apr. 2019, which designated the U.S. and claims priority to MY Patent Application No. PI2018702242 filed 7 Jun. 2018, the entire contents of each of which are hereby incorporated by reference.

FIELD OF INVENTION

The invention relates to a syndet bar (synthetic detergent bar) composition. In more particular, the invention relates to a syndet bar composition containing naturally derived sulfonated methyl esters, which can be used as a personal cleaning or a laundry bar.

BACKGROUND OF THE INVENTION

Soaps play an important role in personal hygiene since its existence or invention during the Mesopotamian civilization back in 2500 BCE. Apart from personal hygiene, soaps are also used today in many domestic and industrial cleaning processes. In the current technologies, bar soaps are industrially produced by continuous saponification of triglycerides or neutralization of fatty acids with alkali.

In recent decades, the role of soaps has evolved with time, where they are not only used for the purpose of cleansing but also for used as skincare. Soaps are expected to produce abundant and creamy foam, hence providing an excellent cleansing effect. At the same time, consumers also expect soaps to provide a moisturizing or hydrating effect, so as to prevent the skin from drying out after cleansing as well as to protect it against external influences that are detrimental to the skin. Therefore, manufacturers of bar soaps are constantly looking for new ingredients which satisfy these increased requirements and expectations from consumers.

The alkali soaps with high pH available in the market, which contain only fatty acid salts and optionally free fatty acids, are not able to provide the expected skincare and cleansing properties. As they are chemically harsh (high pH) they may cause irritation and cracking effects to the consumers' skin. Therefore, another type of bar soaps, namely combination bars or combo soaps is introduced in the industry to maximise cleansing effect while minimising irritation. In addition to fatty acid salts, combo soaps also use a combination of synthetic surfactants, for example, sodium cocoyl isethionate or sulfosuccinate, to promote mildness for skin. Combo soaps contain fatty acid salts, they are less irritating than traditional soaps, yet less mild than syndet bars.

Syndet bars, or synthetic detergent bars, are a new type of soap-free cleansing bars which are made of a combination of different surfactants or tensioactive agents with detergency properties. Apart from impurities, syndet bars are also free from fatty acid salts, and contain only synthetic surfactants. The synthetic surfactants are generally derived from mineral oils, plant oils or animal fats of natural source, hence the syndet bars produced are known to be mild, and beneficial as personal cleansing bars or dermatological bars. Additionally, syndet bars often have a neutral pH which prevents skin irritation.

The syndet bars available in the industry are generally made of sodium cocoyl isethionate. Owing to the popular use of sodium cocoyl isethionate in the manufacture of syndet bars, the price of this ingredient has also gone exorbitant in the industry. There are a number of technologies existing in the art relating to syndet bar compositions made of sodium cocoyl isethionate. For example, U.S. Pat. No. 5,691,287 discloses a low irritation cleansing bar composition containing sodium cocoyl isethionate in an amount of 20% to 35% by weight of the cleansing bar. This composition also contains fatty alcohol with a relatively lower amount of fatty acid. Asides from low irritation effect, there is no disclosure in the document on the performance of the cleansing bar composition in view of its detergency or softening effect. As sodium cocoyl isethionate is used as the main ingredient, the manufacturing costs for this cleansing bar are relatively high. Besides, sodium cocoyl isethionate is also considered as a mild surfactant and may not give rise of the desired detergency.

SME, which is also known as α-sulfo fatty acid methyl ester or methyl ester sulfonates (MES), has been increasingly used as a surfactant in recent years. SME represents a class of anionic surfactants, which is suitable to be applied in various industrial applications, including laundry detergents and dish washing detergents. Being derived from natural, renewable resources, such as palm oil, SMEs are known to be biodegradable and considered as green alternative surfactants. Owing to such renewable properties, they have gradually become a more attractive option to be included in certain synthetic detergent formulas as surfactants. Therefore, limited number of soap bars manufacturing technologies have started to use SMEs in place of sodium cocoyl isethionate as the main ingredient of the bar composition.

As an example, U.S. Patent Publication No. 2007004611 discloses a composition suitable for use in personal cleaning or detergent soap bar, which is also known as a "soap noodle", containing SME as a primary surfactant. This composition also includes a secondary surfactant such as sulfosuccinates and alkyl sulfates. However, the composition disclosed contains a soap, preferably tallow and/or coconut soap, as the main ingredient. It is also stated in the document that the composition is a precursor cleaning or laundry bar with improved hardness, improved resistance to marring, lowered wear-rate and decreased mush formation during consumer use. The document does not disclose any improved moisturizing or softening effect. This tallow and/or coconut soap-containing soap bar composition is regarded as a combo bar composition. It is also stated in this document that syndet bars often possess poor physical properties and are mostly made with mild surfactant that is difficult to fabricate.

There is no teaching provided in the prior art on any specific syndet bar composition containing long carbon chain SME as the essential ingredient, which can give rise of a syndet bar with improved softening effect as well as comparable cleansing performance. Therefore, an improved SME-based syndet bar composition is desirable.

SUMMARY OF INVENTION

One of the objects of the invention is to provide a syndet bar composition containing SME as the essential ingredient in providing a natural and mild cleansing product with improved softening effect, which is useful as a cleansing and skincare products for personal cleaning, laundry or dishwashing.

The invention aims to provide a SME-based syndet bar composition which provides improved softening effect as well as comparable cleansing performance, as compared to sodium cocoyl isethionate-based syndet bar. The SME-based syndet bar composition should also be lower in production costs and cost effective to the consumers.

At least one of the preceding objects is met, in whole or in part, by the invention, in which one of the embodiments of the invention describes a syndet bar or synthetic detergent bar composition comprising SME of a fatty acid having a chain length of 16 to 18 carbon atoms (C16-C18), wherein the SME is present in an amount of 5% to 30% by weight of the composition; a co-surfactant selected from the group consisting of alkyl sulfosuccinate, alkyl sulfate, alkyl ether sulfate, or the combination thereof; a fatty alcohol selected from the group consisting of cetyl alcohol, stearyl alcohol or cetostearyl alcohol; a saturated fatty acid; a filler; and a humectant/moisturiser.

In this specification, the following terms have the meanings below assigned to them as anionic surfactants:

"Alkyl sulfosuccinate" is an sulfosuccinate-type anionic surfactant that includes sulfosuccinate esters having the formula $M^+(O_3SCH(CO_2R^1)CH_2CO2R^2)^-$ wherein $M^+$ is a cation, including alkaline metallic cations such as sodium $Na^+$, and wherein $R^1$ is a hydrogen H, and $R^2$ is an alkyl, or wherein $R^1$ and $R^2$ are both alkyls.

"Alkyl sulfate" is an organosulfate having the functional group structure $R—O—SO_3^-$ wherein R is an organic residue, including an alkyl.

"alkyl ether sulfate" (AES) is a specific group of alkyl sulfate having the general formula $RO(CH_2CH_2O)_nSO_3M$, wherein R represents an alkyl group having 8-18 carbon atoms, n represents an average addition molar number such as about 2-10, and M represents a cation producing a water soluble salt, which includes compounds known under the International Nomenclature of Cosmetic Ingredient (INCI) names such as sodium laureth sulfate (SLES), an accepted contraction of sodium lauryl ether sulfate (SLES), ammonium decyl ether sulfate, etc.

According to a preferred embodiment of the invention, the SME is a compound containing 55% to 99% of C16 SME and 45% to 1% of C18 SME by weight of the compound.

In accordance with another embodiment of the invention, the co-surfactant is present in an amount of 1% to 40% by weight of the composition. In certain embodiments, the co-surfactant can be an alkyl sulfosuccinate, such as disodium lauryl sulfosuccinate; or an alkyl sulfate such as sodium lauryl sulfate (SLS), potassium lauryl sulfate, or a combination thereof; or an alkyl ether sulfate such as sodium lauryl ether sulfate (SLES).

Another embodiment of the invention discloses that the fatty alcohol is present in an amount of 1% to 30% by weight of the composition.

Still another embodiment of the invention discloses that the saturated fatty acid is present in an amount of 1% to 30% by weight of the composition. Preferably, the saturated fatty acid can be stearic acid, palmitic acid, lauric acid, or a combination of any two or more thereof.

It is disclosed in another embodiment of the invention that the filler is present in an amount of 1% to 40% by weight of the composition. In certain embodiments, the filler is wheat starch, corn starch, rice starch, barley starch, oat, tapioca, talcum, sodium sulfate, or a combination of any two or more thereof.

The humectant/moisturiser is present in an amount of 1% to 10% by weight of the composition, according to an embodiment of the invention. Preferably, the humectant/moisturiser is glycerin, water, urea, sodium lactate or a combination of any two or more thereof. For convenience, water is grouped here although it is more a solvent and is added to make up to 100% of the formulation.

Further embodiment of the invention discloses that the syndet bar composition further comprises an anti-cracking agent in an amount of 1% to 15% by weight of the composition. For example, the anti-cracking agent can be hydrogenated vegetable oil, polyethylene glycol or a combination thereof.

The present preferred embodiments of the invention consist of novel features and a combination of parts hereinafter fully described or illustrated in the accompanying drawings and particularly pointed out in the appended claims; it being understood that various changes in the details may be effected by those skilled in the arts but without departing from the scope of the invention or sacrificing any of the advantages of the invention.

DETAILED DESCRIPTION OF THE INVENTION

Hereinafter, the invention shall be described according to the preferred embodiments of the invention and by referring to the accompanying description and drawings. However, it is to be understood that limiting the description to the preferred embodiments of the invention and to the drawings is merely to facilitate discussion of the invention and it is envisioned that those skilled in the art may devise various modifications without departing from the scope of the appended claim.

The invention discloses a syndet bar composition comprising SME of a fatty acid having a chain length of 16 to 18 carbon atoms (C16-C18), wherein the SME is present in an amount of 5% to 30% by weight of the composition; a co-surfactant selected from the group consisting of alkyl sulfosuccinate, alkyl sulfate, alkyl ether sulfate, or the combination thereof; a fatty alcohol selected from the group consisting of cetyl alcohol, stearyl alcohol or cetostearyl alcohol; a saturated fatty acid; a filler; and ahumectant/moisturiser.

SME is used in the syndet bar composition as the surfactant which provides detergency as well as beneficial effects to the skin, for example natural, mild and softening effects. By the term "surfactant" or "surfactant system", it refers to a compound or compounds that are capable of lowering the surface tension or interfacial tension between a liquid and a gas or between two liquids or between a liquid and a solid. Therefore, surfactant is useful as wetting agents, emulsifiers, or detergents.

According to an embodiment of the invention, the SME used in the syndet bar composition is a long carbon chain SME of a fatty acid, having a chain length of 16 to 18 carbon atoms (i.e. C16-C18 SME). C16 SME and C18 SME, respectively, have the molecular structures as shown in the Formula (I) and Formula (II) below:

(I)

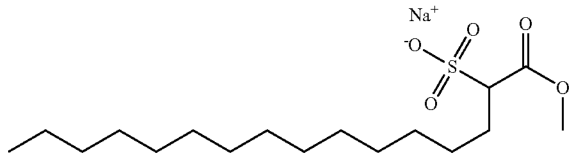

(II)

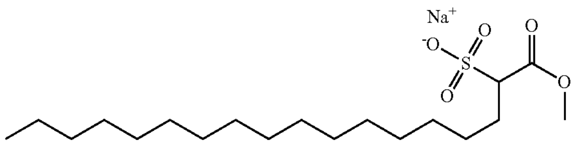

Both C16 and C18 SME can be derived from a natural source, such as plant oils (vegetable oils) or animal fats, including palm oil. Specifically, C16 SME can be obtained from the palmitic acid; while C18 SME can be obtained from stearic acid of palm oil. Both of these SMEs were obtained via sulfonation of methyl ester.

As set forth in the preceding description, SME is present in the syndet bar composition in an amount of approximately 5% to 30% by weight of the composition. For example, it can be present in an amount of 5% to 25%, or 10% to 25%, or 15% to 20% by weight of the composition.

In certain embodiments, the SME used in the syndet bar composition is a compound (blend, or mixture) containing C16 SME and C18 SME in a specific combination ratio. Preferably, the SME compound of the invention can contain approximately 55% to 99% of C16 SME and approximately 1% to 45% of C18 SME by weight of the compound. For example, the SME compound can be a blend of 60% to 90% of C16 SME and 10% to 40% C18 SME, or a blend of 65% to 85% of C16 SME and 15% to 35% C18 SME. Alternatively, the SME compound can also be a blend of 90% to 99% of C16 SME and 1% to 10% C18 SME.

Asides from having SME as the major surfactant, the syndet bar composition of the invention also contains a co-surfactant, which can be present in an amount of approximately 1% to 40% by weight of the composition. In certain embodiments, the co-surfactant can be an alkyl sulfosuccinate, such as disodium lauryl sulfosuccinate; or an alkyl sulfate such as SLS, potassium lauryl sulfate, or a combination thereof; or an alkyl ether sulfate such as SLES; or an alkyl polyglucoside. Without wishing to be bound by the theory, SME, in the presence of the co-surfactant, is expected to produce a synergistic effect in the detergency of the syndet bar. It is appreciated that SLES, if added, should be used in a small quantity (e.g. 2% to 3% by weight of the composition) in order to prevent any undesired properties of the syndet bar produced, for instance, to prevent the bar from being oily and sticky when used.

The co-surfactant is added to the composition to provide good detergency and foaming property. In certain embodiments, the combination of main surfactants and co-surfactants is also capable of reducing skin irritation. For example, the addition of green surfactant, such as alkyl polyglucoside (APG), to linear alkylbenzene sulfonate (LAS) can reduce the irritation of LAS. Alternatively, a combination between APG and SLES in a specific ratio may also reduce the irritation of SLES.

In accordance with another embodiment of the invention, the syndet bar composition also contains a fatty alcohol, which is present in an amount of approximately 1% to 30% by weight of the composition. For example, the fatty alcohol can be present in an amount of 5% to 20% by weight of the composition. As set forth in the preceding description, the fatty alcohol used in the invention can be cetyl alcohol, stearyl alcohol or cetostearyl alcohol (i.e. a mixture of cetyl alcohol and stearyl alcohol). The fatty alcohol plays a role of structurant and emollient in the syndet bar composition. As the fatty alcohol also functions as an anti-cracking agent, the combination between the fatty alcohol (e.g. cetostearyl alcohol) and SME is capable of providing an improved softening as well as anti-cracking effect to the syndet bar.

Apart from fatty alcohol, the syndet bar composition of the invention also contains saturated fatty acid, which also functions as structurant and emollient that enhances the role of the fatty alcohol. In certain embodiments, the inclusion of long chain fatty acid can also help in hardening the syndet bar. Preferably, the saturated fatty acid is present in an amount of approximately 1% to 30% by weight of the composition. The saturated fatty acid can be stearic acid, palmitic acid, lauric acid, or a combination of any two or more thereof, according to one of the embodiments of the invention. One of the preferred saturated fatty acids that can be used in the syndet bar composition is triple pressed stearic acid. In certain embodiments, the triple pressed stearic acid can be present in an amount of 5% to 20% by weight of the composition.

In accordance with another embodiment of the invention, the syndet bar composition also contains filler. The filler can be present in an amount of approximately 1% to 40% by weight of the composition. Specifically, the filler can be present in an amount of 10% to 30% by weight of the composition. In certain embodiments, the filler is wheat starch, corn starch, rice starch, barley starch, oat, tapioca, talcum, sodium sulfate, or a combination of any two or more thereof.

A humectant/moisturiser is present in an amount of approximately 1% to 10% by weight of the composition, according to another embodiment of the invention. For example, the humectant/moisturiser can be present in an amount of approximately 1% to 10% by weight of the composition. Preferably, the humectant/moisturiser is glycerin, water, urea, sodium lactate or a combination of any two or more thereof. Humectant/moisturisers such as glycerin and water can also serve as binders, which cohesively bind the constituting ingredients of the syndet bar composition to form the soap bar.

Further embodiment of the invention discloses that the syndet bar composition further comprises an anti-cracking agent in an amount of 1% to 15% by weight of the composition. For example, the anti-cracking agent can be a hydrogenated vegetable oil, polyethylene glycol or a combination thereof. Preferably, the anti-cracking agent can be a hydrogenated castor oil. Syndet bar may sometimes be difficult to be shaped. In order to increase the hardness of the syndet bar for different applications, the weight percentage of the hydrogenated vegetable oil can be increased.

The combination of ingredients does not require adjustment on the di-salt content, yet it is capable of providing a hard bar soap due to the specific formulation and the specific blend of ingredients. The syndet bar of the invention is substantially soap-free, mild and produces creamy foam. Therefore, it is suitable to be used by the consumers as a personal cleansing bar. It can also be used as a cleansing agent for animals (e.g. pets) due to its low pH and mild to skin. In certain embodiments, additional ingredients, such as anti-bacterial agents and cysteine, can be added to animal cleansing products. It can also be used industrially or domestically for laundry, dishwashing or hard surface cleaning.

In certain embodiments of the invention, the syndet bar composition can further comprise a preservative, a stabilizing agent, flavouring agent, colouring agent, or a combination of any two or more thereof. As a personal cleansing bar which also provides a skincare effect, the syndet bar composition can further comprise an additive, such as a skin conditioning agent, skin moisturizing agent, skin hydrating agent, oil-controlling agent, soothing agent or whitening agent.

In accordance with another embodiment of the invention, the syndet bar composition can further comprise a nutritious component, such as vitamins and minerals, naturally derived essential oils, bioflavonoids and anti-oxidants, which protects the skin from drying out due to the detergency effect, preventing the skin from external damages by leaving a protective layer to the skin, or improving overall hygiene and health of the skin. For example, the vitamins and minerals can be vitamin E (tocotrienols, tocopherols or the combination thereof), vitamin A, silica, magnesium, calcium, potassium, zinc, copper, selenium, chromium and sulfur. In certain embodiments, titanium dioxide can be added to increase the whiteness of the syndet bar and provide an even colour appearance to the bar.

The syndet bar composition can be prepared in the form of solid bar soaps, or any other suitable solid forms such as soap pellets or soap flakes. Exemplary formulations of this SME-based syndet bar are further detailed in the Examples. The syndet bar can be produced from the various ingredients, via a simple mixing process of powder and liquid ingredients. The process includes the steps of mixing liquid ingredients in a cold process.

The liquid ingredients include the humectant/moisturiser (e.g. glycerine and water) and polyethylene glycol. This can be followed by melting solid ingredients, including the SME, co-surfactant, fatty alcohol, saturated fatty acid and filler, at high temperature. The hot liquids of melted ingredients and the cold liquids from the cold process can be mixed in a screw mixing unit at hot temperature to form a paste, which is subject to a flaking process on a cold drum. The flakes obtained can be packed to form the soap bars.

The performance of the SME-based syndet bar can be tested in comparison to the commercially obtained syndet bar or combo bar. An example of the comparison test, namely, F-test and T-test on the soap bar performance is further detailed in Example 2. As shown in the comparison data in Tables 4 and 5, SME-based syndet bar is shown to provide comparable cleansing as that of the commercially obtained syndet bar or the commercially obtained sodium lauroyl isethionate-based combo soap, while gives rise of an improved softening effect as compared to these commercially obtained soap bars. It can be shown by the experimental data that the syndet bar of the invention is mild and having low irritation. The skin does not feel dry after use of the syndet bar and after washing, and the stratum corneum (uppermost layer of the skin) is intact. Without wishing to be bound by the theory, it is believed that the combination of the active ingredients in the syndet bar can help the stratum corneum to retain water hence showing an effect of skin-softening.

EXAMPLES

Example 1 Syndet Bar Formulation

The SME-based syndet bar can be prepared based on the formulations as shown in Tables 1-3.

TABLE 1

| Ingredient | Weight percentage range (% wt) |
|---|---|
| C16-C18 SME | 10-30 |
| Disodium lauryl sulfosuccinate | 5-20 |
| Potassium lauryl sulfate | 5-20 |
| Cetearyl alcohol | 5-15 |
| Triple pressed stearic acid | 5-15 |
| Hydrogenated castor oil | 1-10 |
| Wheat starch | 10-30 |
| Glycerine | 1-10 |
| Water | to 100% |

TABLE 2

| Ingredient | Weight percentage range (% wt) |
|---|---|
| C16-C18 SME | 10-30 |
| Disodium lauryl sulfosuccinate | 5-20 |
| Potassium lauryl sulfate | 5-20 |
| Stearyl alcohol | 5-15 |
| Palmitic acid | 5-15 |
| Polyethylene glycol | 1-10 |
| Corn starch | 10-30 |
| Glycerine | 1-10 |
| Water | to 100% |

TABLE 3

| Ingredient | Weight percentage range (% wt) |
|---|---|
| C16-C18 SME | 10-30 |
| Disodium lauryl sulfosuccinate | 5-20 |
| Potassium lauryl sulfate | 5-20 |
| Cetyl alcohol | 5-15 |
| Lauric acid | 5-15 |
| Hydrogenated castor oil | 1-10 |
| Wheat starch | 10-30 |
| Glycerine | 1-10 |
| Titanium dioxide | 0.1-0.5 |
| Water | to 100% |

Example 2 F-test and T-test for the Syndet Bar Formulation

Statistical tests, including F-test and T-test, were conducted to assess the performance of the SME-based syndet bar composition. A SME syndet bar prepared based on the formulation of Table 1 was used as the test sample, in comparison to a commercially obtained syndet bar (which contains disodium lauryl sulfosuccinate as the main ingredient) and a combo soap (which contains sodium lauroyl isethionate as the main ingredient) Both the commercially obtained syndet bar and the combo bar do not contain SME. These test samples were assessed based on the soap performance parameters, including rinsability, smoothness, softening, lubricity and lather. In particular, all the subjects (i.e. the participants involved in the panel test) were required to fill in a questionnaire with all these performance parameters, and they were requested to evaluate the different samples in a quantitative manner. The comparison data of both F-test and T-test between the SME-based syndet bar and the commercial syndet bar are demonstrated in Table 4; while that between the SME-based syndet bar and the commercial combo bar are demonstrated in Table 5.

TABLE 4

| | F-test | | | T-Test | | |
|---|---|---|---|---|---|---|
| | Calculated | Critical | Result | Calculated | Critical | Result |
| Rinsability | 1.179 | 1.984 | Not significant different | 0.222 | 2.011 | Not significant different |
| Smoothness | 2.485 | 1.984 | Significant different | 0.983 | 2.020 | Not significant different |
| Softening | 1.580 | 1.984 | Not significant different | 2.019 | 2.011 | Significant different |
| Lubricity | 1.161 | 1.984 | Not significant different | 1.106 | 2.011 | Not significant different |
| Lather | 1.104 | 1.984 | Not significant different | 0.368 | 2.011 | Not significant different |

TABLE 5

| | F-test | | | T-Test | | |
|---|---|---|---|---|---|---|
| | Calculated | Critical | Result | Calculated | Critical | Result |
| Rinsability | 1.343 | 1.984 | Not significant different | 0.789 | 2.011 | Not significant different |
| Smoothness | 0.818 | 0.504 | Significant different | 0.718 | 2.011 | Not significant different |
| Softening | 1.011 | 1.984 | Not significant different | 0.383 | 2.011 | Not significant different |
| Lubricity | 1.138 | 1.984 | Not significant different | 0.870 | 2.011 | Not significant different |
| Lather | 1.126 | 1.984 | Not significant different | 0.296 | 2.011 | Not significant different |

F-test focuses on the analysis of variance of the sample data while T-test refers to testing hypothesis of sample means to assess if the sets of samples are significantly different. Based on the test results shown in Tables 4 and 5, the SME-based syndet bar is demonstrated to perform as good as the commercially obtained combo soap, while providing improved softening effect as compared to the commercially obtained syndet bar. Such improvement in softening effect was shown to be significant by the T-test results.

The invention claimed is:

1. A syndet bar composition comprising:

sulfonated methyl ester of a fatty acid having a chain length of 16 to 18 carbon atoms (C16-C18), wherein the sulfonated methyl ester is present in an amount of 5% to 30% by weight of the composition, wherein the sulfonated methyl ester is a compound containing 60% to 90% of C16 sulfonated methyl ester and 10% to 40% of C18 sulfonated methyl ester by weight of the compound;

a co-surfactant selected from the group consisting of alkyl sulfosuccinate, alkyl sulfate, alkyl ether sulfate, alkyl polyglucoside, and combinations thereof;

a fatty alcohol, in an amount of 5% to 20% by weight of the composition, selected from the group consisting of cetyl alcohol, stearyl alcohol, and cetostearyl alcohol;

a saturated fatty acid; a filler; and a humectant/moisturiser, wherein apart from impurities, the syndet bar composition is free of fatty acid salts.

2. The syndet bar composition according to claim 1, wherein the co-surfactant is present in an amount of 1% to 40% by weight of the composition.

3. The syndet bar composition according to claim 1, wherein the alkyl sulfosuccinate is disodium lauryl sulfosuccinate.

4. The syndet bar composition according to claim 1, wherein the alkyl sulfate is sodium lauryl sulfate, potassium lauryl sulfate, or a combination thereof.

5. The syndet bar composition according to claim 1, wherein the alkyl ether sulfate is sodium lauryl ether sulfate.

6. The syndet bar composition according to claim 1, wherein the co-surfactant comprises disodium lauryl sulfosuccinate.

7. The syndet bar composition according to claim 1, wherein the co-surfactant comprises sodium lauryl sulfate, potassium lauryl sulfate, or a combination thereof.

8. The syndet bar composition according to claim 6, wherein the co-surfactant further comprises sodium lauryl sulfate, potassium lauryl sulfate, or a combination thereof.

9. The syndet bar composition according to claim 6, wherein the co-surfactant is present in an amount of 1% to 40% by weight of the composition.

10. The syndet bar composition according to claim 8, wherein the co-surfactant is present in an amount of 1% to 40% by weight of the composition.

11. The syndet bar composition according to claim 1, wherein the saturated fatty acid is present in an amount of 1% to 30% by weight of the composition.

12. The syndet bar composition according to claim 1, wherein the saturated fatty acid is stearic acid, palmitic acid, lauric acid, or a combination of any two or more thereof.

13. The syndet bar composition according to claim 1, wherein the filler is present in an amount of 1% to 40% by weight of the composition.

14. The syndet bar composition according to claim 1, wherein the filler is wheat starch, corn starch, rice starch, barley starch, oat, tapioca, talcum, sodium sulfate, or a combination of any two or more thereof.

15. The syndet bar composition according to claim 1, wherein the humectant/moisturiser is present in an amount of 1% to 10% by weight of the composition.

16. The syndet bar composition according to claim 1, wherein the humectant/moisturiser is glycerin, water, urea, sodium lactate or a combination of any two or more thereof.

17. The syndet bar composition according to claim 1 further comprising an anti-cracking agent in an amount of 1% to 15% by weight of the composition.

18. The syndet bar composition according to claim 17, wherein the anti-cracking agent is a hydrogenated vegetable oil, polyethylene glycol, or a combination thereof.

19. A syndet bar composition having the following ingredients:
(1) sulfonated methyl ester of a fatty acid having a chain length of 16 to 18 carbon atoms (C16- C18), in an amount of 10-30% by weight;
(2) disodium lauryl sulfosuccinate, in an amount of 5-20% by weight;
(3) potassium lauryl sulfate, in an amount of 5-20% by weight;
(4) cetearyl alcohol, in an amount of 5-15% by weight;
(5) stearic acid, in an amount of 5-15% by weight;
(6) hydrogenated castor oil, in an amount of 5-10% by weight;
(7) wheat starch, in an amount of 10-30% by weight;
(8) glycerine, in an amount of 1-10% by weight; and
(9) water,
with the total weight of (1)-(9) being 100%.

20. A syndet bar composition characterized as
i) having the following ingredients:
(1) sulfonated methyl ester of a fatty acid having a chain length of 16 to 18 carbon atoms (C16- C18), in an amount of 10-30% by weight;
(2) disodium lauryl sulfosuccinate, in an amount of 5-20% by weight;
(3) potassium lauryl sulfate, in an amount of 5-20% by weight;
(4) stearyl alcohol, in an amount of 5-15% by weight;
(5) palmitic acid, in an amount of 5-15% by weight;
(6) polyethylene glycol, in an amount of 1-10% by weight;
(7) corn starch, in an amount of 10-30% by weight;
(8) glycerine, in an amount of 1-10% by weight; and
(9) water,
or
ii) having the following ingredients:
(1) sulfonated methyl ester of a fatty acid having a chain length of 16 to 18 carbon atoms (C16- C18), in an amount of 10-30% by weight;
(2) disodium lauryl sulfosuccinate, in an amount of 5-20% by weight;
(3) potassium lauryl sulfate, in an amount of 5-20% by weight;
(4) cetyl alcohol, in an amount of 5-15% by weight;
(5) lauric acid, in an amount of 5-15% by weight;
(6) hydrogenated castor oil, in an amount of 1-10% by weight;
(7) wheat starch, in an amount of 10-30% by weight;
(8) glycerine, in an amount of 1-10% by weight;
(9) titanium dioxide, in an amount of 0.1-0.5% by weight, and
(10) water,
wherein the total weight of (1)-(9) in i) or (1)-(10) in ii) is 100%.

* * * * *